3,284,497
PHOSPHINIC AMIDES
Morris L. Nielsen, Dayton, Ohio, assignor to Monsanto Research Corporation, St. Louis, Mo., a corporation of Delaware
No Drawing. Filed July 29, 1963, Ser. No. 298,401
3 Claims. (Cl. 260—551)

The present invention relates to nitrogenous organic compounds of phosphorus, and more particularly provides a new and valuable class of phosphinic amides and the method of preparing the same.

According to the invention, there are prepared certain N-substituted (haloalkyl)hydrocarbylphosphinic amides by the reaction of (haloalkyl)hydrocarbylphosphinic halides with an aromatic hydrocarbon amine, substantially according to the scheme:

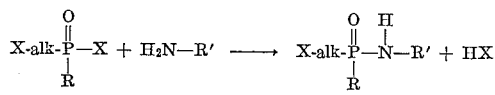

where X is halogen having an atomic weight of over 35, alk denotes an alkylene radical of from 1 to 5 carbon atoms, and R and R' denote aromatic hydrocarbyl which is free of olefinic and acetylenic unsaturation, contains from 6 to 12 carbon atoms, and is attached through nuclear carbon to the remainder of the molecule in which it is present.

Useful phosphinic chlorides include the (haloalkyl) phenylphosphinic chlorides, bromides or iodides wherein the haloalkyl group is e.g., chloromethyl, bromomethyl, iodomethyl, 2-chloroethyl, dichloromethyl, 3-bromopropyl, 2-chloropropyl, 4-chlorobutyl, 1,1,2,3-tetrachlorobutyl, 5-bromopentyl, 3-iodopentyl, etc. The phenyl group may or may not be substituted by one or more alkyl or cycloalkyl groups having from 1 to 6 carbon atoms but containing not more than a total of 6 carbon atoms in all of the alkyl substituents, or it may be replaced by the biphenylyl or the naphthyl radical.

The aromatic amine may be aniline or nuclearly alkylated or cycloalkylated aniline or it may be α- or β-naphthylamine, an acenaphthenylamine, or a biphenylylamine.

(Halo)alkyldihydrocarbylphosphinic amides provided by the invention are, e.g., P-(chloromethyl)-N,P—diphenylphosphinic amide, P-(chloromethyl)-N-phenyl-P-(o-, m- or p-tolyl)phosphinic amide, P-(chloremethyl)-N,P-(o-, m- or p-ditolyl(phosphinic amide, P-(iodomethyl)-N,P-bis(pentamethylphenyl)phosphinic amide, P - (bromomethyl)-N-phenyl-P-(α- or β-naphthyl)phosphinic amide, P-(chloromethyl)-N-methyl-P-(o-, m- or p-biphenylyl) phosphinic amide, P-(chloroethyl)-N,P-diphenylphosphinic amide, P-(2,3-dichloropropyl)-N-phenyl-P-(p-tert-butylphenyl)phosphinic amide, P-(trichloromethyl)-N,P-diphenylphosphinic amide, P-(perchloroethyl)-N,P-bis(p-isopropylphenyl)phosphinic amide, P-(5-iodopentyl)-N,P-(di-α-naphthyl)phosphinic amide, P-(bromomethyl)-N-phenyl-P-(1-acenaphthenyl)phosphinic amide, P-(chloromethyl) - P - (p-cyclohexylphenyl) - N - (p - hexylphenyl)phosphinic amide, etc.

Reaction of the (haloalkyl)hydrocarbylphosphinic halide with the aromatic hydrocarbon amine to give the presently provided N-substituted (haloalkyl)phosphinic amides is conducted by simply mixing the two reactants and allowing the mixture to stand until formation of the amide is completed. Advantageously, in order to obtain smooth reaction and optimum yield of the product, the reaction is conducted in the presence of an inert organic liquid diluent or solvent, which may be, e.g., an aliphatic or aromatic hydrocarbon such as hexane, benzene or xylene, a chlorinated hydrocarbon such as chloroform, carbon tetrachloride or chlorobenzene, etc.

The reaction is generally exothermic; hence, heating is usually not required and may be conducted by operating at ambient temperatures, or even with cooling. However, when working with the somewhat sluggish hydrocarbylphosphinic halides, e.g. the (haloalkyl)biphenylylphosphinic chlorides or the (haloalkyl)naphthylphosphinic bromides, heating may be used for the purpose of decreasing reaction time. Temperatures of from, say, 60° C. to 150° C. are thus useful. When working in the presence of a diluent or solvent, refluxing temperatures of the reaction mixture are conveniently employed to assure completion of the reaction.

Since reaction occurs with liberation of hydrogen halide, it is conveniently effected in the presence of a basic agent which will serve as hydrogen halide scavenger by forming a solid hydrohalide. Conveniently, an excess of the aromatic hydrocarbon amine may be used for this purpose. However, it may be any organic or inorganic base which does not react with the phosphinic halide in preference to said amine, e.g., an alkali metal hydroxide or a basic salt thereof such as sodium, potassium, lithium or rubidium hydroxide, carbonate or acetate; an alkali metal alkoxide such as sodium or potassium methoxide or propoxide; a tertiary alkylamine such as trimethylamine or tributylamine, a heterocyclic nitrogen base such as N-methylmorpholine or pyridine, a quaternary ammonium compound such as benzyltrimethylammonium methoxide or tetrabutylammonium butoxide, etc. An excess of the aromatic hydrocarbon amine is preferred.

Instead of using a hydrogen halide scavenger, or together with the scavenger, mechanical provision may be made for removal of the halide as it is formed, e.g., by means of vigorous stirring and/or dephlegmation.

One mole of the (haloalkyl)hydrocarbylphosphinic halide reacts with one mole of the said amine to give the present N-substituted (haloalkyl)hydrocarbylphosphinic amides; hence, the two reactants may be employed in such stoichiometric proportions. However, as above-stated, an excess of the aromatic hydrocarbon amine is conveniently used for the purpose of serving as scavenger for the by-product hydrogen halide. The resulting hydrohalide is readily removed from the reaction product by filtering or centrifuging, since it is insoluble in most organic solvents and in the reactants. Any excess of phosphinic halide or of the said amine may be separated by distillation.

The presently provided N-substituted (haloalkyl)hydrocarbyl phosphinic amides are stable, well defined compounds which are generally high-melting, crystalline solids. They are particularly valuable as starting materials for the preparation of linear, polymeric phosphinic amides by reaction with haloalkanols, thus:

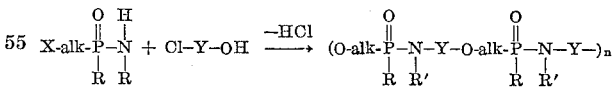

where $n$ denotes the degree of polymerization, Y is an alkylene radical of 2 to 6 carbon atoms and R and R' are as defined above. Haloalkanols which are useful in the above reaction are, e.g., chloro-, bromo- or iodoalkanols of 2 to 6 carbon atoms such as 2-chloroethanol, 3-bromopropanol, 3-iodobutanol, 6-chlorohexanol, etc. Also useful as reactants for conversion of the present N-substituted (haloalkyl)hydrocarbylphosphinic amides into linear polymers are compounds having two olefinic or acetylenic groups which are known to react with hydroxy or amino compounds by addition across the unsaturated bond, for example, the diacrylates such as ethylene glycol diacrylate or dipropiolates such as the dipropiolates which are disclosed in U.S. Patent No. 3,082,242, issued to Lee A. Miller et al. One mole of the diacrylate or of the dipropiolate combines with one mole of the present amide to give a linear polymer having alternating carboxylate and phosphorus amide linkages. Thus, the dipropiolate of 2,2-dimethyl-1,3-propanediol reacts with P-chloromethyl-N-phenyl-P-p-tolylphosphinic amide to give a linear polymer having the repeating unit

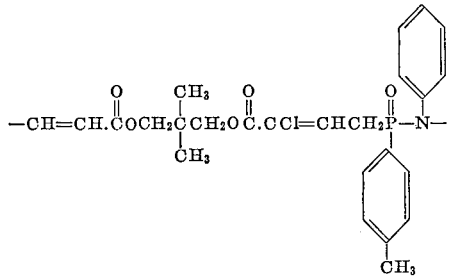

The linear condensation polymers formed by reaction of the present N-substituted (haloalkyl)hydrocarbylphosphinic amides with haloalkanols or by the addition polymerization of diacrylates or dipropiolates with said phosphinic amides are characterized by very good thermal resistance and solutions thereof are eminently suited for use as coatings in applications where high resistance to heat is required. The polymers may also be molded under heat and pressure to give well-dimensioned molded pieces, or they may be used as adhesives or impregnants in the production of laminates.

The presently provided phosphinic amides are also useful as intermediates for the production of ether-amides, i.e., by reaction of the halogen of the haloalkyl radical with an alkanol. Such ether-amides are generally water-soluble compounds possessing surface-activity, particularly when the alkanol is a higher fatty alcohol such as dodecanol or tridecanol or a mixture of higher alcohols obtained according to the "Oxo" process by reaction of carbon monoxide with hydrogen at superatmospheric pressure.

The invention is further illustrated by, but not limited to, the following example.

*Example 1*

To a solution of 41.8 g. (0.2 mole) of (chloromethyl)-phenylphosphinic chloride in 300 ml. of dry benzene there was added dropwise 42 ml. (0.44 mole) of aniline during a 30-minute period. The temperature rose exothermally to 60° C. The whole was then heated at reflux briefly, until the yellow color of the reaction mixture appeared to become more intense. Benzene was then removed under vacuum, and the residue was extracted repeatedly with acetone and water, alternately. The combined extracts were reduced in volume by evaporating off the organic solvents, and water was added to the residue. The solids which were thus formed were filtered off, taken up in benzene and alcohol, and then precipitated with hexane and dried. Recrystallization by dissolving in acetone and then adding an equal amount of water gave the substantially pure P-chloromethyl-N,P-diphenylphosphinic amide, M.P. 171–2° C., and showing by nuclear magnetic resonance analysis from 1-methyl-2-pyrrolidone a $P^{31}$ peak at —20.0 p.p.m.

The present invention is not to be considered as limited by the above example, which is given by way of illustration, only. It will be obvious to those skilled in the art that many modifications can be made within the spirit of the invention, which is limited only by the terms of the appended claims.

What I claim is:

1. The compound of the formula

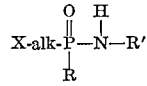

in which X is halogen having an atomic weight of over 35, alk denotes an alkylene radical of from 1 to 5 carbon atoms, and R and R' denote aromatic hydrocarbyl which is free of olefinic and acetylenic unsaturation, contains from 6 to 12 carbon atoms and is attached through nuclear carbon to the remainder of the molecule in which it is present.

2. The compound of the formula

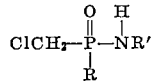

wherein R and R' denote aromatic hydrocarbyl which is free of olefinic and acetylenic unsaturation, contains from 6 to 12 carbon atoms and is attached through nuclear carbon to the remainder of the molecule in which it is present.

3. P-(chloromethyl)-N,P-diphenylphosphinic amide.

References Cited by the Examiner

UNITED STATES PATENTS 2,852,550  9/1958  Godfrey _____ 260—461

OTHER REFERENCES

Houben-Weyl, Methoden der Organischen Chemie, 4th ed., vol. 12, pages 263 and 535–6 (1963).

Moedritzer, J. Am. Chem. Society, vol. 83, pages 4381–85 (1961).

Wagner et al., Synthetic Organic Chemistry (Wiley and Sons), pages 566–7 (1953).

WALTER A. MODANCE, *Primary Examiner.*

HARRY I. MOATZ, *Assistant Examiner.*